United States Patent
Pleiman et al.

(10) Patent No.: US 9,950,649 B2
(45) Date of Patent: Apr. 24, 2018

(54) CHILD CAR SEAT HAVING ADJUSTABLE HEADREST BOLSTERS

(71) Applicant: Evenflo Company, Inc., Miamisburg, OH (US)

(72) Inventors: Brian Ralph Pleiman, Centerville, OH (US); Andrew R. Davis, Huber Heights, OH (US)

(73) Assignee: EVENFLO COMPANY, INC., Miamisburg, OH (US)

( * ) Notice: Subject to any disclaimer, the term of this patent is extended or adjusted under 35 U.S.C. 154(b) by 220 days.

(21) Appl. No.: 15/174,299

(22) Filed: Jun. 6, 2016

(65) Prior Publication Data

US 2017/0349065 A1    Dec. 7, 2017

(51) Int. Cl.
*B60N 2/28* (2006.01)
*B60N 2/48* (2006.01)

(52) U.S. Cl.
CPC ......... *B60N 2/2851* (2013.01); *B60N 2/2884* (2013.01); *B60N 2/4808* (2013.01); *B60N 2/4882* (2013.01); *B60N 2/4885* (2013.01); *B60N 2/809* (2018.02); *B60N 2/885* (2018.02); *B60N 2/888* (2018.02)

(58) Field of Classification Search
None
See application file for complete search history.

(56) References Cited

U.S. PATENT DOCUMENTS

| | | | | |
|---|---|---|---|---|
| 3,957,262 | A * | 5/1976 | McReynolds | A61B 6/0421 297/391 |
| 4,102,564 | A * | 7/1978 | Michael | A61B 3/113 248/118 |
| 4,938,529 | A * | 7/1990 | Fourrey | B60N 2/449 297/284.9 |
| 6,648,416 | B2 * | 11/2003 | O'Connor | A47C 7/383 297/397 |
| 6,910,735 | B2 * | 6/2005 | Asbach | A47D 1/002 297/112 |
| 8,251,444 | B2 * | 8/2012 | Rajasingham | B60N 2/2812 297/216.1 |
| 8,469,032 | B2 * | 6/2013 | Farnum | A61G 13/1215 128/845 |
| 8,888,187 | B2 * | 11/2014 | Albino | B60N 2/4879 297/392 |
| 2012/0326476 | A1 | 12/2012 | Runk et al. | |

* cited by examiner

*Primary Examiner* — David E Allred
(74) *Attorney, Agent, or Firm* — Baker & Hostetler LLP

(57) ABSTRACT

A child car seat that includes a headrest portion that is adjustable with respect to the car seat base in a vertical and horizontal direction, wherein the adjustment of the headrest in a vertical direction is accomplished via a screw-type mechanism.

18 Claims, 4 Drawing Sheets

CHILD CAR SEAT HAVING ADJUSTABLE HEADREST BOLSTERS

TECHNICAL FIELD

The present disclosure generally relates to child car seats, and more particularly to a child car seat having adjustable headrest side bolsters.

BACKGROUND

Children's car seats are known in the art and generally have a hard plastic shell covered in padded soft goods. The typical seat also has a safety harness for securing a child in the seat. The harness arrangement is configured to retain a child occupant in the seat during use, especially in the event of a vehicle crash. The car seat usually has a seating area contoured to receive a child in a seated position.

In children's car seats of the type discussed above, the seat back of the child car seat has an upper portion that is typically wide enough to accommodate the shoulders of a child occupant. Due to the width, the upper portion of the seat back may permit a smaller child's head to move left and right excessively. Excessive lateral or side-to-side movement of a child's head can cause injury in the event of an emergency maneuver or a vehicle accident, especially during a side impact event. A child's head and neck can also move excessively even while the child is relaxed in the seat, such as while they sleep. Such excessive movement is especially undesirable in the case of younger children who could be more prone to injury.

Soft padded head rests in the form of neck stabilizers or soft head rests are known in the art. Such head rests can be added to the seat back to help address the above issues. These types of soft head rests are sometimes available with car seats and sometimes provided separately as an add-on accessory for a car seat that lacks such a soft, padded head rest. These types of head rests or pads can provide some degree of support, but generally are not adjustable to accommodate children having different head sizes and comfort tolerances.

There are many kinds of child car seats on the market that can be used in multiple configurations. U.S. Pat. No. 6,682,143 B2 discloses a conventional child car seat adapted to be used in an automobile. A larger-sized child can be secured on this conventional child car seat directly by the seat belt of the automobile.

U.S. Pat. No. 4,754,999 discloses another conventional child car seat that includes a base member and a seat assembly coupled on the base member and having a backrest.

U.S. Pat. No. 5,845,967 discloses still another conventional child car seat including a unitary shell having an upper backrest portion and a lower seat portion connected to each other by an integral hinge. The upper backrest portion can pivot relative to the lower seat portion to a position so that it is aligned with the lower seat portion to thereby facilitate storage and transport of this conventional child car seat.

U.S. Pat. No. 5,845,968 discloses yet another conventional child car seat including a seat member and a backrest member. The backrest member can be stowed within the seat member, thereby also facilitating packing and shipping of this conventional child car seat.

U.S. Pat. No. 7,625,043 discloses another car seat having a car seating portion that may be separated from the main portion of the seat. The main portion of the seat is pivotally attached to the base member.

However, despite these prior art child car seats, it is still desired to have a child car seat that includes a head rest area for a child seated therein. More particularly, it would be desirable to have a child car seat wherein the headrest support for the child is adjustable in both a horizontal and vertical direction with respect to the head of the child seated therein.

SUMMARY

According to an embodiment of the present disclosure, a child car seat is provided that includes a headrest portion that is adjustable with respect to the car seat base in a vertical and horizontal direction. More particularly, the present disclosure is directed to adjustable headrest bolsters that may be adjusted horizontally with respect to a child's head seated in the corresponding car seat. In accordance with such an embodiment of the disclosure, an adjustment mechanism may be provided that simply and securely allows for the adjustment of the horizontal headrest bolsters in accordance herewith. According to another aspect of the disclosure, a headrest portion is provided that may slide in a vertical direction with respect to the car seat and that includes headrest bolsters that may be adjusted horizontally with respect thereto.

BRIEF DESCRIPTION OF THE DRAWINGS

The above-mentioned and other features of the disclosure may be clarified by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

Figure 1:
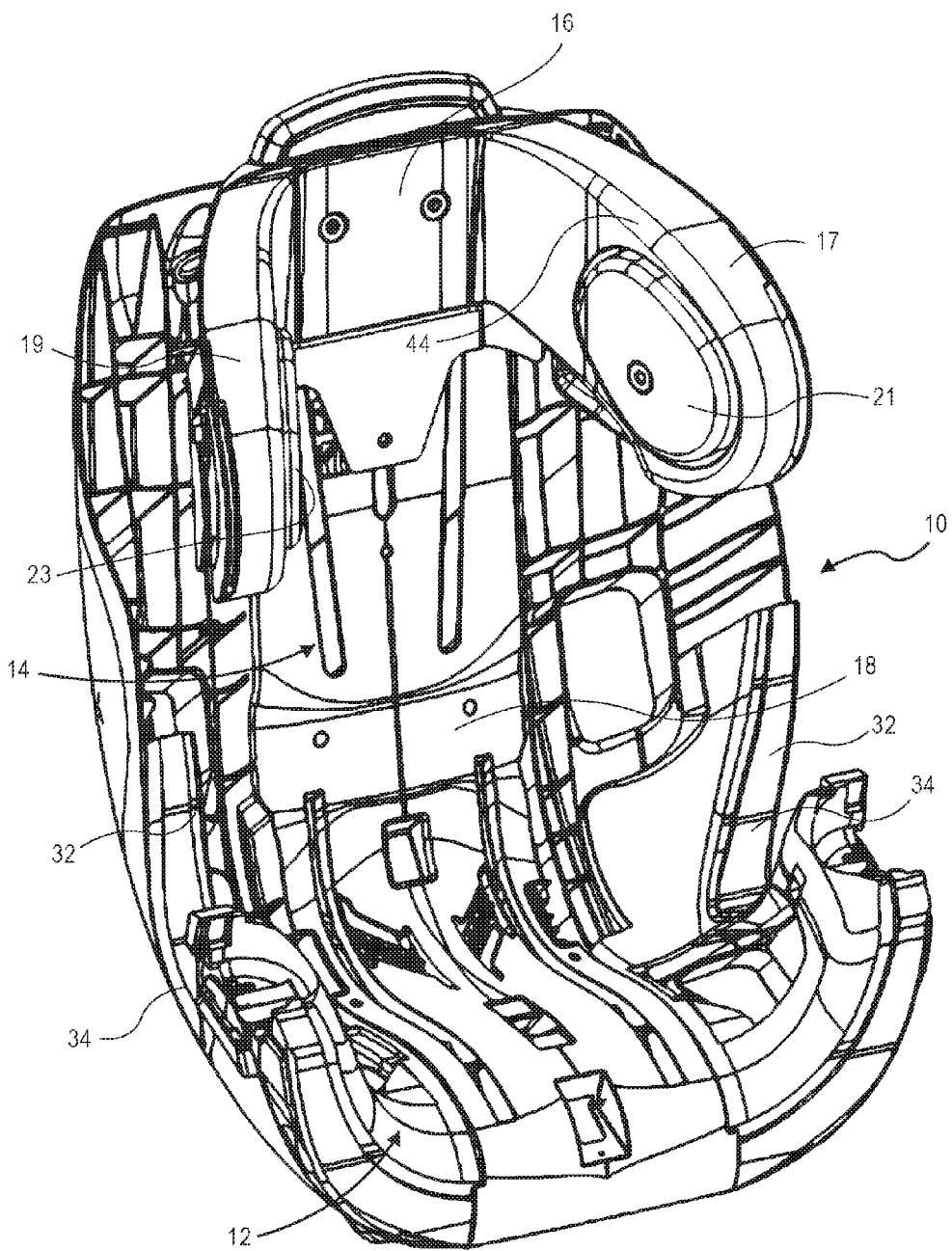
FIG. 1 is a front perspective of a child car seat in accordance with aspects of the present disclosure.
Figure 3:
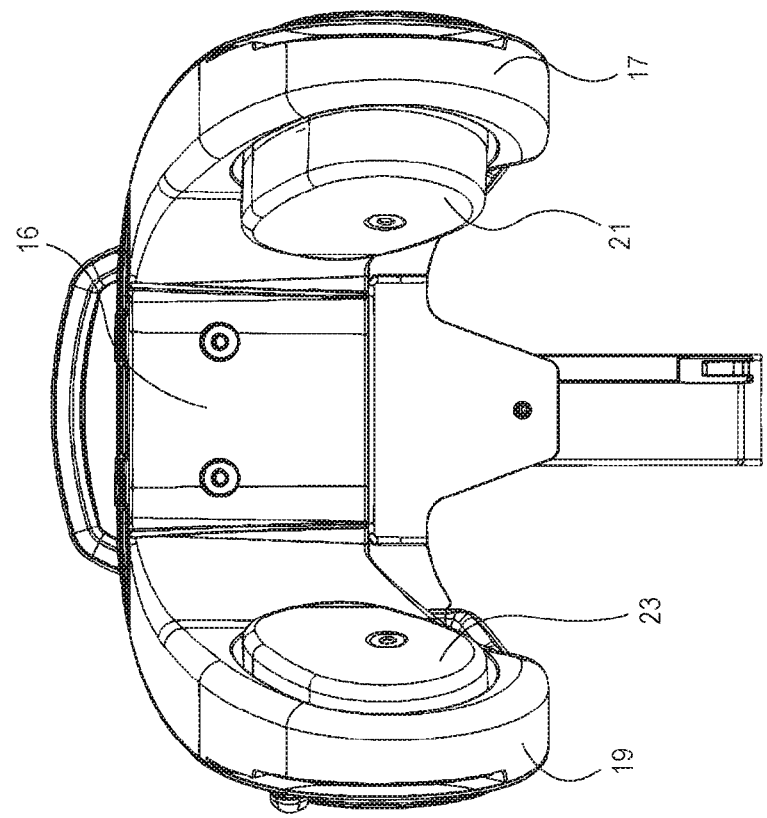
FIG. 3 is a front perspective view of the headrest portion of FIG. 2.
Figure 2:
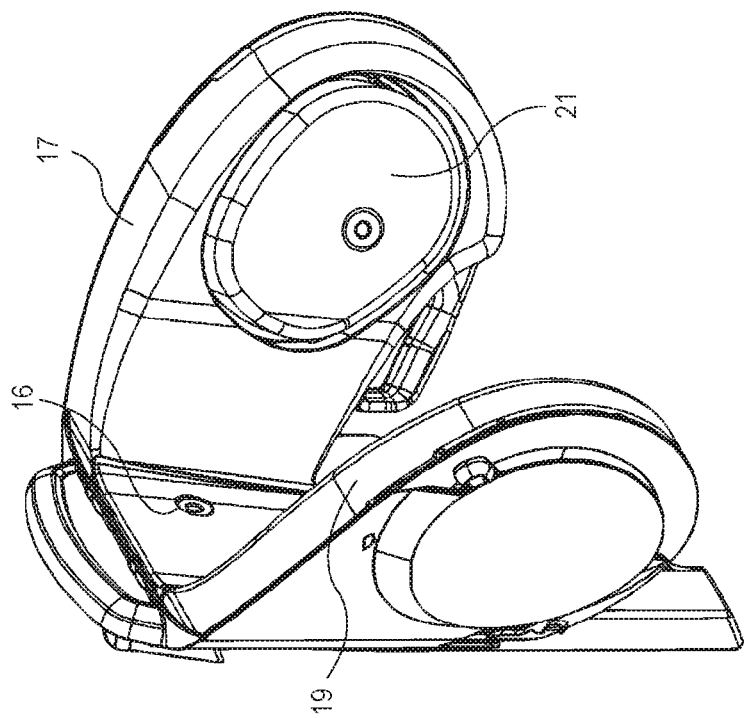
FIG. 2 is a side perspective view of a headrest portion for use in connection with the child car seat of FIG. 1.

While an embodiment of a child car seat is provided herein that discloses a headrest portion that is moveably adjustable in a generally vertical direction with respect to the car seat and which includes headrest bolsters that are movably adjustable in a generally horizontal direction thereto, there is shown in the drawings and will herein be described in detail one or more embodiments of a single such harness car seat, with the understanding that this disclosure is to be considered an exemplification of the principles disclosed herein and is not intended to be limited to merely the illustrated and discussed embodiments.

Referring to FIG. 1, an exemplary car seat 10 is shown. Car seat 10 is generally comprised of a seating portion 12 and a back rest portion 14. Back rest portion 14 includes head rest portion 16 and lumbar support portion 18. Head rest portion 16 is adjustable and lockable relative to lumbar support portion 18 in a generally vertical direction with respect to the seating portion 12 and includes side wing portions 17, 19. Side wing portions 17, 19 may be made out of practically any material but is preferably made from material having energy absorbing qualities, such as, for example, EPS foam. Head rest portion 16 includes an adjustment mechanism (not shown) for adjusting the head rest portion 16 with respect to lumbar portion 18.

The head rest portion 16 can be vertically adjusted positionally along the back rest portion 14 to further accommodate different sized children. This is generally illustrated in FIG. 1 where the head portion 16 is shown in an uppermost raised position, but can be adjusted downward using an adjustment mechanism (not shown) as is known in the art. The lumbar support portion 18 may include side supports 32 having notches 34 therein for receiving a car seat 10 lap belt (not shown) therethrough. In accordance with an embodiment of the disclosure, the wing portions 17, 19 are spaced apart a sufficient distance to accommodate the head of the largest-sized child for which the car seat 10 is designed. However, for the reasons noted above, this distance between the wing portions 17, 19 can be too large for some smaller children placed in the seat 10.

In accordance therewith, the wing portions 17, 19 of the seat 10 are provided with adjustable supports 21, 23 that are adjustably mounted within an orifice 24 formed in an outer portion of the wing portions 17, 19. The adjustable supports 21, 23 may be of any desired shape and size, but maybe oblong as shown in FIGS. 1-4. They may be made of any desired material, but as with the wing portions 17, 19 are preferred to be made of a material having shock absorbing properties (such as EPS foam). Alternatively, the adjustable supports 21, 23 may be made of plastic or other harder material and then covered with cushioning material (not shown) and/or covered in expandable soft goods (not shown) as is known in the art. The adjustable supports 21, 23 may be used to adjust the distance therebetween depending on the child in the seat to provide the desired amount of cushioning.

Figure 4:
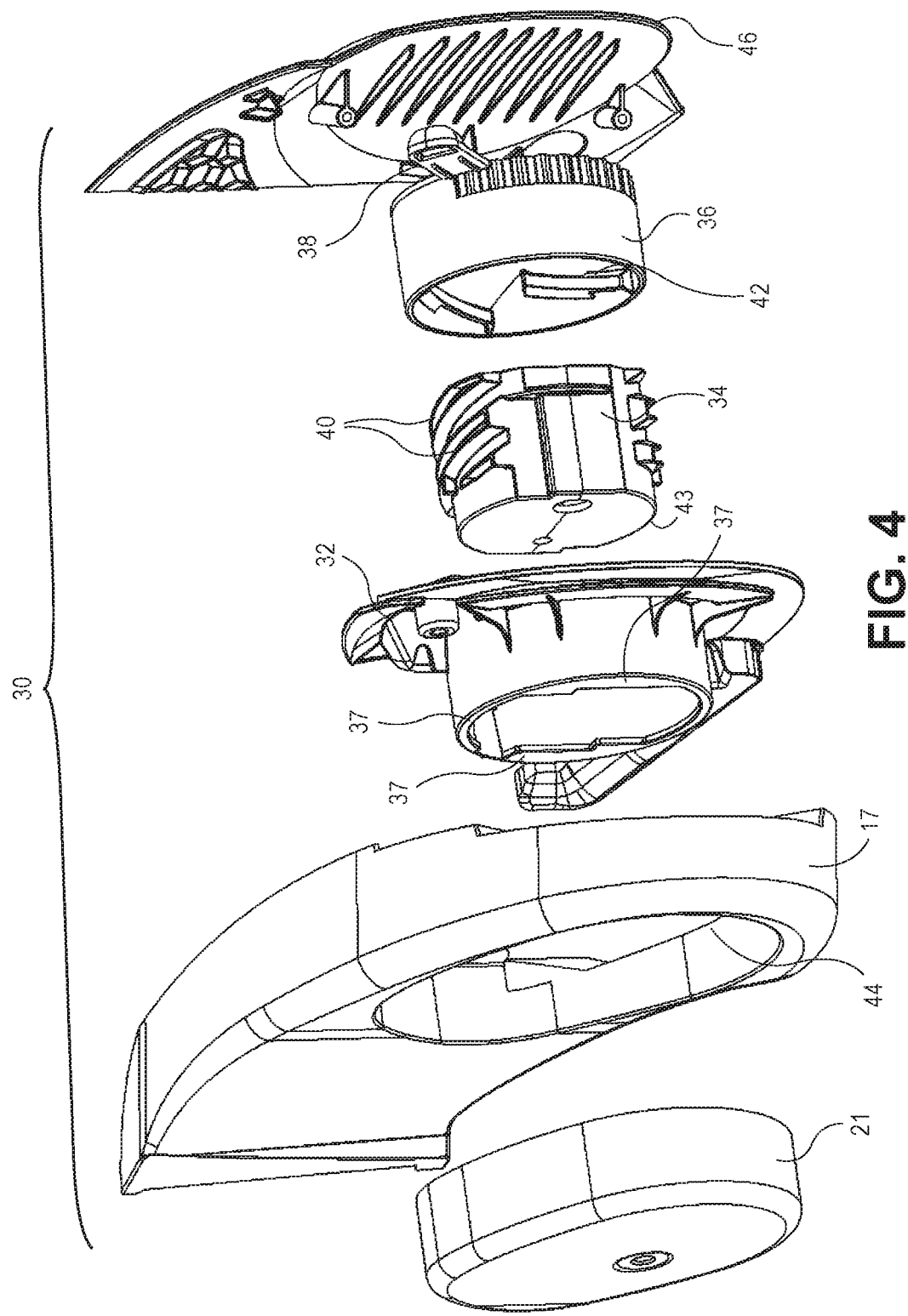
FIG. 4 is an exploded perspective view of the head rest portion of FIGS. 2 and 3 showing an exploded view of the adjustable headrest bolster mechanism.
Figure 5:
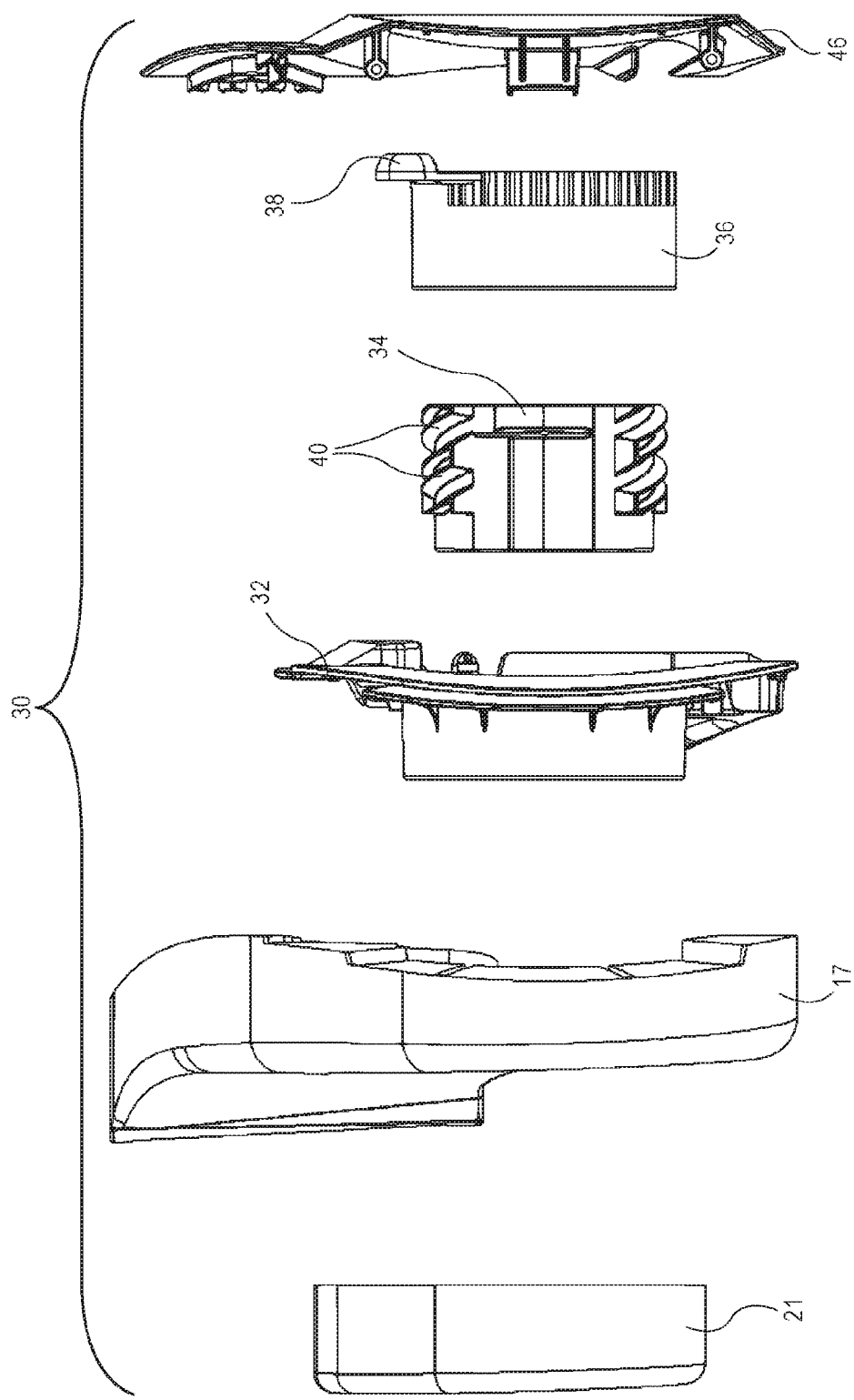
FIG. 5 is a side elevation view of the exploded perspective view of FIG. 4.

In a preferred embodiment of the disclosure, as shown best in FIG. 4, the adjustment of the adjustable supports 21, 23 may be accomplished via a screw adjustment mechanism 30. A single screw adjustment mechanism 30, as shown in FIGS. 4 and 5, is preferably comprised of an adjustable support 21, a retainer guide 32, a thread adjust 34, and an adjustment collar 36 having a lever 38 attached thereto. In accordance with this embodiment of the disclosure, the thread adjust 34 is provided with threads 40 thereon and the adjustment collar 36 has complementary threads 42 for interacting therewith and causing translational movement thereof. The retainer guide 32 includes an outer lip 37 that is "keyed" to the outer profile 43 of the thread adjust 34 such that the adjustment collar 36 is retained from outward movement from the retainer guide 32 while still allowing outward translational movement of the thread adjust 34.

The adjustable support 21 is sized and shaped to translate freely through a corresponding orifice 44 in the wing portion 17 and is fixedly attached by a fastener, rivet, screw, etc. to the thread adjust 34 such that translational movement of the thread adjust 34 is directly transmitted to the adjustable support 21. The retainer guide 32 may be fixedly attached to either the wing portion 17 or a back face 46 thereof and may be shaped and sized as desired so long as the adjustment collar 36 may freely rotate, but not significantly translate, therein and such sufficient space is provided for the lever 38 to be rotated by a user to translate the adjustable support 21 in and out of the orifice 44 as desired.

In accordance with this disclosure, once assembled the screw adjustment mechanism may be operated by moving the lever 38 downward to translate the screw adjust 34, and thus the attached adjustable support 21, outward of the wing support 17 (i.e. inward toward the head of a child seated in the seat 10). Conversely, the movement of the lever 38 upward causes translational movement of the screw adjust 34 and the adjustable support inward of the wing support 17, (i.e. away from the head of a child seated in the seat 10). In a preferred embodiment, the shape and size of the adjustment collar 36 vis-à-vis the retainer guide 32, as well as the attachment of the retainer guide 32 to either the wing support 17 or the back face 46, is such that enough friction exists within the adjustment mechanism 30 that the adjustment collar 36 maintains its user-selected position when the lever 38 is adjusted by a user but not so much friction that user-adjustment is difficult.

In accordance with aspects of the disclosure, the wing supports 17, 19 and adjustable supports 21, 23 maybe made of energy absorbing material such as EPS foam, or other closed or open-cell foams. Conversely, those components, as well as the other components, may be comprised of plastics as is known in the industry and then covered with "soft goods" comprising a removable padded cover. The soft goods may be made of various fabrics such as neoprene, polyester, cotton, or any other suitable fabric or a combination thereof. The soft goods can be quilted or padded and include multiple layers. The fabric can be chosen for comfort, cushioning, durability, wear resistance, stain resistance, resiliency, and/or for energy absorbing characteristics.

Although a specific adjustable head support for use in a child car seat has been described herein in accordance with the teachings of the present disclosure, the scope of coverage of this patent is not limited thereto. More specifically, following from the above description it should be apparent to those of ordinary skill in the art that, while the systems, methods and apparatuses herein described constitute exemplary embodiments of the present disclosure, it is understood that the disclosure is not limited to these precise systems, methods and apparatuses and that changes may be made therein without departing from the scope of the disclosure.

What is claimed is:

1. A child car seat comprising:
   a seating portion and a back rest portion, said back rest portion having an adjustable head rest portion generally vertically adjustable with respect to the seating portion;
   a pair of adjustable supports mounted generally opposite each other on the head rest portion; and
   each of said adjustable supports including a screw adjustment mechanism for adjusting a distance between the supports generally horizontally with respect to the seating portion;
   wherein the head rest portion includes opposed wing portions protruding forward relative to the back rest portion and the adjustable supports are mounted on the wing portions for linearly inward translational movement; and
   wherein the screw adjustment mechanisms each comprises a respective one of the adjustable supports, each adjustable support including a respective thread adjust portion directly coupled to the adjustable support and having threads thereon, a respective adjustment collar having complementary threads thereon, and a respective retainer guide for preventing translational movement of the adjustment collar while allowing rotating movement thereof, such that rotational movement of the adjustment collar causes the adjustable support to linearly translate.

2. The child car seat of claim 1 wherein each adjustable support is formed from a material having shock absorbing properties.

3. The child car seat of claim 1 further comprising adjustment levers on the adjustment collars for grasping and movement by a user.

4. The child car seat of claim 1 wherein the retainer guides include an outer lip that is keyed to the outer profile of the thread adjust such that the adjustment collars are retained from outward translational movement from the retainer guides while still allowing outward translational movement of the thread adjusts.

5. The child car seat of claim 1 wherein the thread adjust portions are fixedly attached to the adjustable supports.

6. The child car seat of claim 5 wherein the thread adjust portions are attached to the adjustable supports by fasteners.

7. The child car seat of claim 1 wherein the retainer guides are attached to the wing supports.

8. The child car seat of claim 1 wherein the adjustable supports are formed from EPS.

9. The child car seat of claim 3 wherein the wing portions are formed from EPS.

10. The child car seat of claim 1 further comprising back faces attached to the wing portions.

11. A child car seat comprising:
   a seating portion and a back rest portion, said back rest portion having an adjustable head rest portion generally vertically adjustable with respect to the seating portion, the headrest portion having two opposed wing portions thereon;
   a pair of adjustable supports mounted generally opposite each other in the wing portions, respectively, and configured for laterally inward linear translation of the adjustable supports for engaging a seat occupant head during adjustment; and
   each of said adjustable supports including a screw adjustment mechanism for adjusting a distance between the supports generally horizontally with respect to the seating portion;
   wherein each screw adjustment mechanism comprises a thread adjust portion and an adjustment collar and one of the thread adjust portion and the adjustment collar is directly coupled to the adjustable support to directly linearly translate the adjustable support when the other of the thread adjust portion and the adjustable collar is rotated.

12. The child car seat of claim 11 wherein the screw adjustment mechanisms each comprises a respective one of the adjustable supports, each adjustable support including a respective one of the thread adjust portions having threads thereon, a respective one of the adjustment collars having complementary threads thereon, and a respective retainer guide for preventing translational movement of the adjustment collar while allowing rotating movement thereof, such that rotational movement of the adjustment collar causes the adjustable support to translate.

13. The child car seat of claim 12 further comprising adjustment levers on the adjustment collars for grasping and movement by a user.

14. The child car seat of claim 12 wherein the retainer guides include an outer lip that is keyed to the outer profile of the thread adjust such that the adjustment collars are retained from outward translational movement from the retainer guides while still allowing outward translational movement of the thread adjusts.

15. The child car seat of claim 12 wherein the thread adjust portions are fixedly attached to the adjustable supports.

16. The child car seat of claim 15 wherein the thread adjust portions are attached to the adjustable supports by fasteners.

17. The child car seat of claim 12 wherein the retainer guides are attached to the wing supports.

18. The child car seat of claim 1 wherein the adjustable supports are formed from EPS.

* * * * *